United States Patent
Chang et al.

(10) Patent No.: US 10,036,810 B2
(45) Date of Patent: Jul. 31, 2018

(54) NON-CONTACT OPTICAL SENSING DEVICE AND METHOD FOR SENSING DEPTH OF AN OBJECT IN THREE-DIMENSIONAL SPACE

(71) Applicant: EMINENT ELECTRONIC TECHNOLOGY CORP. LTD., Hsinchu (TW)

(72) Inventors: Tom Chang, Taipei (TW); Kao-Pin Wu, New Taipei (TW)

(73) Assignee: EMINENT ELECTRONIC TECHNOLOGY CORP. LTD., Hsinchu (TW)

( * ) Notice: Subject to any disclaimer, the term of this patent is extended or adjusted under 35 U.S.C. 154(b) by 213 days.

(21) Appl. No.: 15/157,030

(22) Filed: May 17, 2016

(65) Prior Publication Data
US 2017/0074983 A1    Mar. 16, 2017

Related U.S. Application Data

(60) Provisional application No. 62/216,368, filed on Sep. 10, 2015.

(30) Foreign Application Priority Data

Feb. 3, 2016    (TW) ............... 105103633 A

(51) Int. Cl.
*G01S 17/08*    (2006.01)
*G01S 7/48*    (2006.01)

(52) U.S. Cl.
CPC ............ *G01S 17/08* (2013.01); *G01S 7/4808* (2013.01)

(58) Field of Classification Search
CPC ............................. G01S 17/08; G01S 7/4808
See application file for complete search history.

(56) References Cited

U.S. PATENT DOCUMENTS

| | | | |
|---|---|---|---|
| 7,683,954 B2* | 3/2010 | Ichikawa | G01S 7/4816 250/208.1 |
| 9,062,969 B1* | 6/2015 | Degges, Jr. | G01C 3/00 |
| 9,977,128 B2* | 5/2018 | Oberhammer | G01S 17/36 |
| 2006/0192086 A1* | 8/2006 | Niclass | H01L 27/14647 250/214.1 |
| 2011/0063437 A1* | 3/2011 | Watanabe | G01S 7/4802 348/140 |
| 2011/0188028 A1 | 8/2011 | Hui et al. | |
| 2013/0050676 A1 | 2/2013 | d'Alginy | |

(Continued)

FOREIGN PATENT DOCUMENTS

| | | |
|---|---|---|
| CN | 104215966 A | 12/2014 |
| CN | 104903677 A | 9/2015 |
| TW | 201243373 A1 | 11/2012 |

*Primary Examiner* — Que T Le
*Assistant Examiner* — Jennifer Bennett
(74) *Attorney, Agent, or Firm* — patenttm.us

(57) ABSTRACT

A method for sensing depth of an object in three-dimensional space a Time-Of-Flight Sensing procedure and a Proximity-Sensing procedure are respectively operated in the same one period of time. The obtained information of the two procedures are manipulated to acquire the depth information of the measured object. With the result of the Time-Of-Flight Sensing procedure having high accuracy and the result of the Proximity-Sensing procedure having high resolution, the acquired depth information of the measured object is more precise.

18 Claims, 14 Drawing Sheets

(56) References Cited

U.S. PATENT DOCUMENTS

2013/0222550 A1    8/2013  Choi et al.
2013/0321584 A1* 12/2013  Choi ...................... G01S 17/89
                                                                348/46

* cited by examiner

NON-CONTACT OPTICAL SENSING DEVICE AND METHOD FOR SENSING DEPTH OF AN OBJECT IN THREE-DIMENSIONAL SPACE

CROSS-REFERENCE TO RELATED APPLICATIONS

This application claims the benefit of U.S. provisional application filed on Sep. 10, 2015 and having application Ser. No. 62/216,368, the entire contents of which are hereby incorporated herein by reference This application is based upon and claims priority under 35 U.S.C. 119 from Taiwan Patent Application No. 105103633 filed on Feb. 3, 2016, which is hereby specifically incorporated herein by this reference thereto.

BACKGROUND OF THE INVENTION

1. Field of the Invention

The present invention relates to an optical sensing device, especially to a non-contact optical sensing device and method for sensing depth of an object in three-dimensional space.

2. Description of the Prior Arts

With the progress of the technology, electronic products change with each passing day. The ways to input data or command into the electronic products also advance. From the traditional physical keyboard as an input way, it develops to input with a virtual keyboard in touch panel. Recently, a non-contact way to input is also developed. The user does not need to touch the electronic device. The electronic device detects and identifies the user's gesture performing in the air through a non-contact sensor to execute a corresponding command. Especially to an apparatus that has an augmented reality (AR) function, using non-contact input is more intuitive and more convenient. Conventional non-contact sense mainly include two different ways. One way is to use proximity-sensing (PS) and another way is to use time-of-flight (TOF) sensing.

The PS procedure utilizes the optical elements to emit light on the objects to generate reflected light and utilizes the energies of the reflected light to determine the depth of the objects. However, since the objects with different colors absorb the energies of light differently, the different objects at the same depth may be determined as locating at different depths. For example, when the user has metal ornaments worn on the fingers, the depths of the fingers and the metal ornaments are determined as locating at different depths since the meal ornaments and the fingers absorb energies of light differently. Therefore, using the PS procedure easily results in the misjudgment of the depths of the objects.

The TOF sensing procedure utilizes the optical elements to emit light on the objects to generate reflected light and utilizes the time difference between the emitting time of the light and the receiving time of the reflected light to determine the depths of the objects. Since the velocity of light is not influenced by the absorbed energies of the objects, the depth determined by the TOF sensing procedure is more accurate than the depth determined by the PS procedure.

However, the reliability of the determined depth of the TOF sensing procedure has a larger tolerance scope than the reliability of the determined depth of the PS procedure according to the following formulas.

The TOF sensing procedure calculates the depth based on the data measured at different phases. The formula to calculate the tolerance scope $\delta d$ of the depth d of the object is shown as following:

$$d = c\delta T = \frac{c}{\omega}\phi = \frac{c}{\omega}\tan^{-1}\frac{Q_0}{Q_{90}} \approx \frac{c}{\omega}\frac{Q_0}{Q_{90}}$$

$$\delta d = \frac{c}{\omega}\left(\frac{\delta Q_0}{Q_{90}} - \frac{Q_0 \delta Q_{90}}{Q_{90}^2}\right)$$

$$\frac{\delta d}{d} = \frac{Q_{90}}{Q_0}\left(\frac{\delta Q_0}{Q_{90}} - \frac{Q_0 \delta Q_{90}}{Q_{90}^2}\right) = \frac{\delta Q_0}{Q_0} - \frac{\delta Q_{90}}{Q_{90}}$$

$$\sigma\left(\frac{\delta d}{d}\right) = \sqrt{\sigma^2\left(\frac{\sigma Q_0}{Q_0}\right) + \sigma^2\left(\frac{\sigma Q_{90}}{Q_{90}}\right)}$$

The Poisson distribution of the TOF sensing procedure is:

$$\sigma\left(\frac{Q}{\delta Q}\right) \to \sqrt{N} \text{ where } N = \frac{Q}{q}$$

The unreliability of the depth is:

$$\sigma\left(\frac{\delta d}{d}\right) = \sqrt{\frac{1}{N_0} + \frac{1}{N_{90}}} = \frac{1}{\left(\frac{SNR_0}{SNR}\right)\left(\frac{SNR_{90}}{SNR}\right)}\frac{1}{SNR}$$

$$\frac{1}{\left(\frac{SNR_0}{SNR}\right)\left(\frac{SNR_{90}}{SNR}\right)} > 1$$

The "$N_0$" and "$N_{99}$" represents the amount of the photons at the 0 degrees phase and 90 degrees phase. Therefore, the formula represents the nonlinear relationship between the unreliability of the depth and the amount of the photons.

On the other hand, the PS procedure calculates the depth of the object based on the intensity of the reflected light. The formula of the PS procedure is as following:

$$Q = \frac{K}{d^2}$$

$$\delta Q = K\left(-2\frac{1}{d^3}\right)\delta d$$

$$\frac{\delta Q}{Q} = -2\frac{\delta d}{d}$$

$$\frac{\delta d}{d} = -\frac{1}{2}\frac{\delta Q}{Q}$$

$$\sigma\left(\frac{\delta d}{d}\right) = -\frac{1}{2}\sigma\left(\frac{\delta Q}{Q}\right)$$

The Poisson distribution of the TOF sensing procedure is:

$$\sigma\left(\frac{\delta Q}{Q}\right) \to \frac{1}{\sqrt{N}} \text{ where } N = \frac{Q}{q}$$

The unreliability of the depth is:

$$\sigma\left(\frac{\delta d}{d}\right) = -\frac{1}{2}\sqrt{\frac{1}{N}} = -\frac{1}{2SNR}$$

The formula represents the linear relationship between the unreliability of the depth and the amount of the photons.

Therefore, the unreliability of the depth of the PS procedure is smaller than the unreliability of the depth of the TOF sensing procedure.

Since the signal-to-noise ration (SNR) is inversely proportional to the unreliability, the SNR of the TOF sensing procedure is less than the SNR of the PS procedure. It means that the tolerance scope of the depth measured by the TOF sensing procedure is larger than the tolerance scope of the depth measured by the PS procedure. For example, if the tolerance scope of the depth measured by the TOF sensing procedure is 0.02, the tolerance scope of the depth measured by the PS procedure may be 0.005. Therefore, the resolution of the PS procedure is higher than the resolution of the TOF sensing procedure.

SUMMARY OF THE INVENTION

To overcome the aforementioned shortcomings of the two conventional ways, the present invention provides a non-contact optical sensing device and method for sensing depth of an object in three-dimensional space to mitigate or obviate the aforementioned problems.

To achieve the aforementioned purpose, a method for sensing depth of an object in three-dimensional space, in one periodic time, comprising steps of:

a. emitting light by a first emitting unit to the object to generate a first reflected light, and obtaining a first data based on a time difference between an emitting time of the first emitting unit to emit the light and a receiving time of the first reflected light;

b. emitting light by a second emitting unit to the object to generate a second reflected light, and obtaining a second data based on an intensity of the second reflected light; and c. determining the depth of the object by calculating the first data and the second data.

In addition, a non-contact optical sensing device of the present invention comprises:

a first emitting unit adapted for emitting light to an object;

a second emitting unit adapted for emitting light to the object;

a photoelectric element adapted for receiving a reflected light from the object;

a first switching element coupling to the photoelectric element;

a second switching element coupling to the photoelectric element;

a control unit electrically connecting to the first emitting unit, the second emitting unit, the photoelectric element, the first switching element and the second switching element, controlling the first and second switching elements to obtain an output of the photoelectric element, and alternatively switching on the first and second switching elements, wherein the control unit executes following steps in one periodic time:

a. emitting light by the first emitting unit to the object to generate a first reflected light, and obtaining a first data based on a time difference between an emitting time of the first emitting unit to emit the light and a receiving time of the first reflected light received by the photoelectric element;

b. emitting light by the second emitting unit to the object to generate a second reflected light, and obtaining a second data based on an intensity of the second reflected light; and c. determining the depth of the object by calculating the first data and the second data.

The present invention has following advantages. By executing the TOF sensing procedure and the PS procedure in a periodic time, two depths of the object are obtained in two different procedures and are manipulated to obtain the depth of the object. Using the high accuracy of the TOF procedure to compensate the low accuracy of the PS procedure, and using the high resolution of the PS procedure to compensate the high accuracy of the TOF procedure. Therefore, the present invention determines the depth of the non-contact object in three-dimensional space more precisely.

Other objectives, advantages and novel features of the invention will become more apparent from the following detailed description when taken in conjunction with the accompanying drawings.

DETAILED DESCRIPTION OF THE EMBODIMENTS

Figure 1:
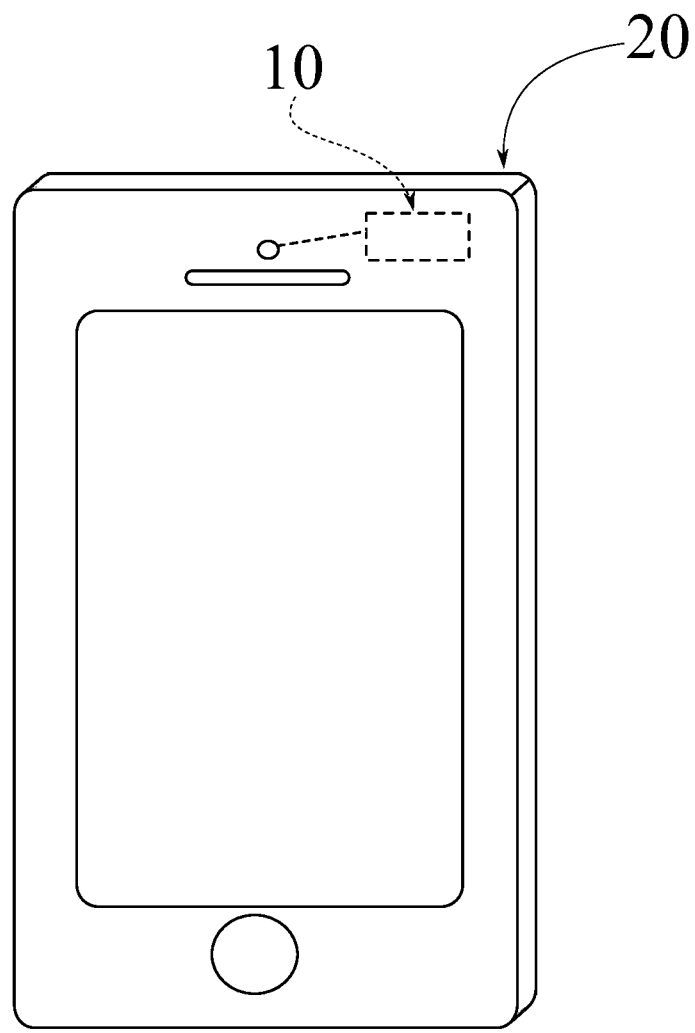
FIG. 1 is an illustrative view of a non-contact optical sensing device in accordance with the present invention mounted in an electronic device.
Figure 2A:
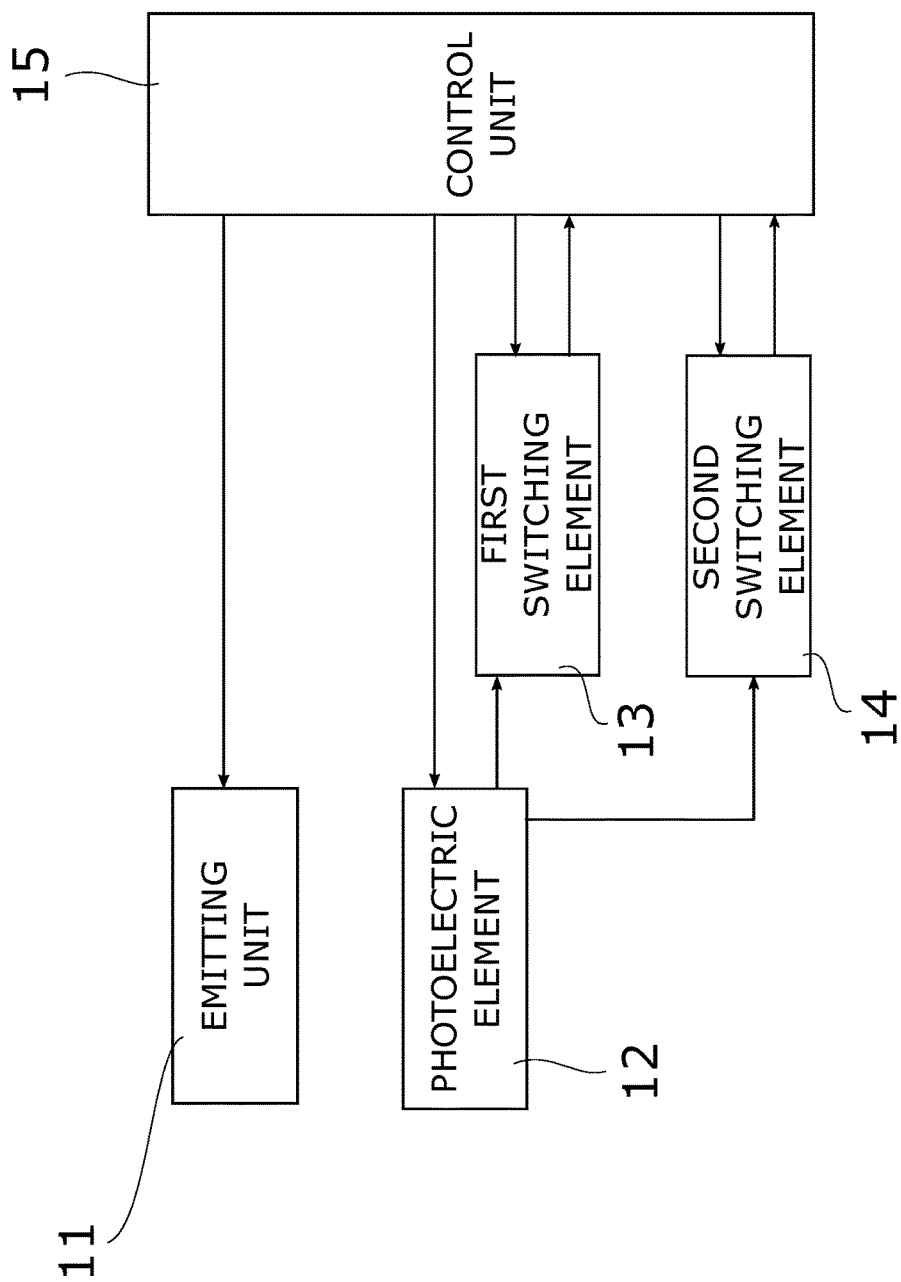
FIG. 2A is a block diagram of the non-contact optical sensing device in FIG. 1.

With reference to FIGS. 1 and 2A, a non-contact optical sensing device 10 in accordance with the present invention is implemented in an electronic device 20. The non-contact optical sensing device 10 comprises at least one emitting unit 11, a photoelectric element 12, a first switching element 13, a second switching element 14 and a control unit 15.

Figure 2B:
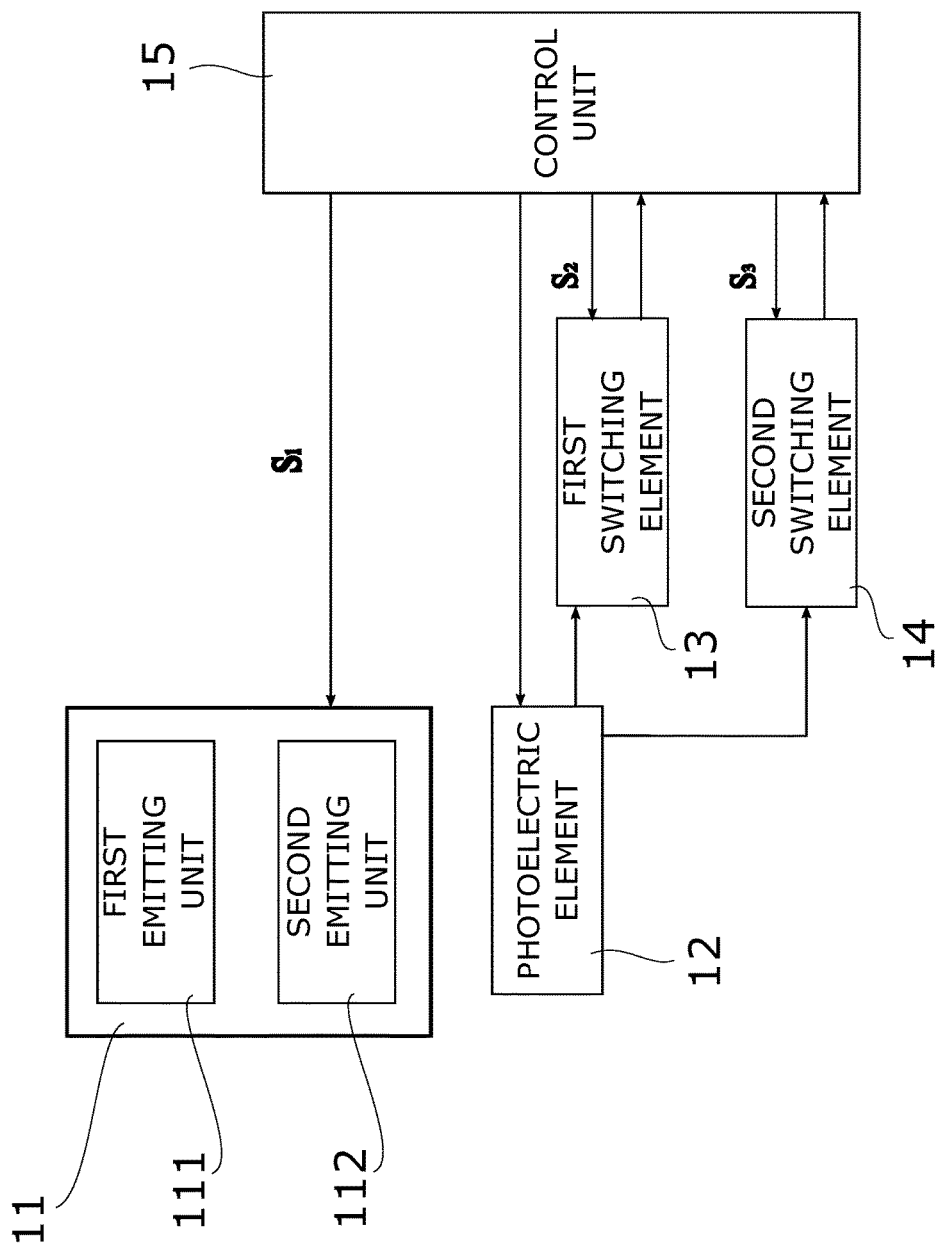
FIG. 2B is an operational block and signal diagram of the non-contact optical sensing device in FIG. 1 when executing TOF sensing procedure.
Figure 2C:
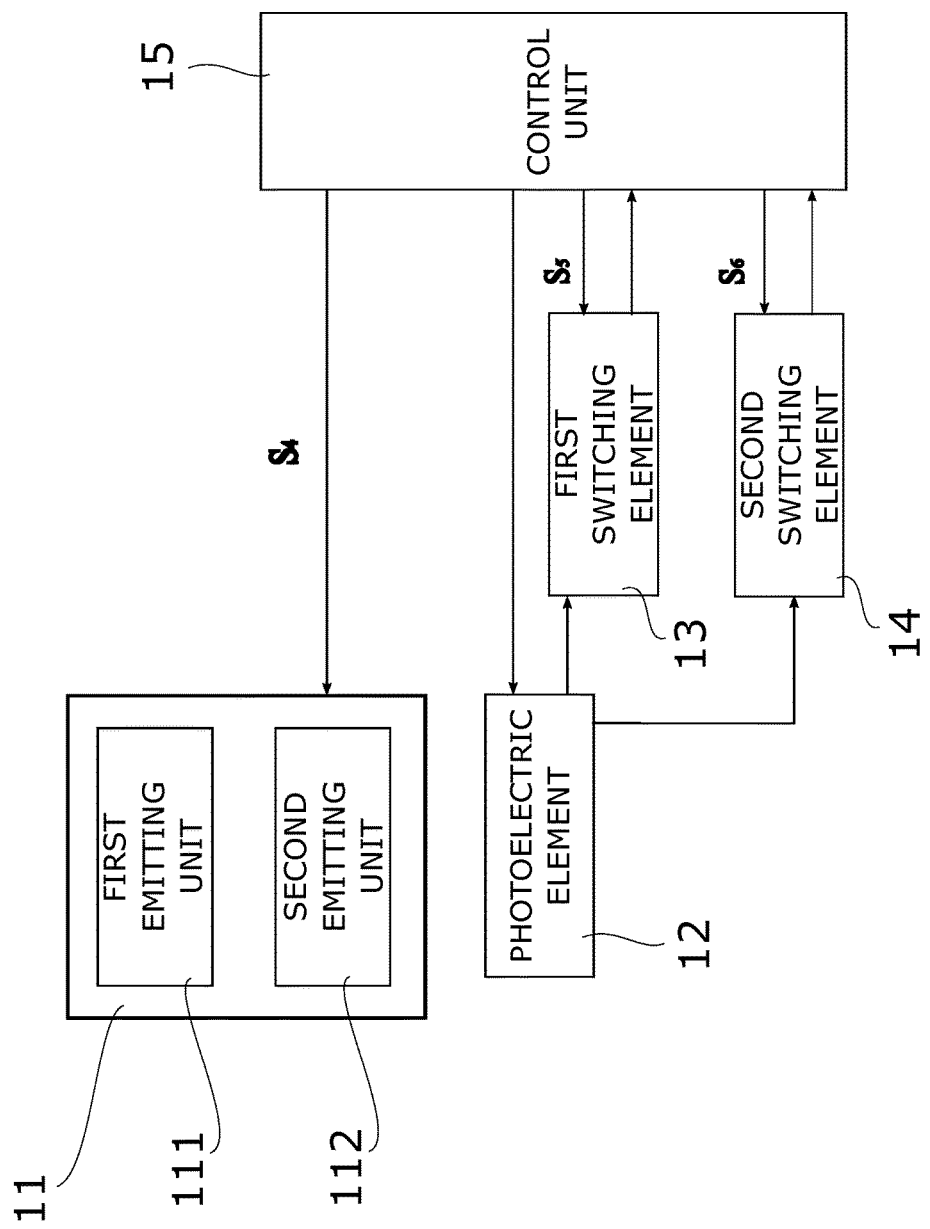
FIG. 2C is an operational block and signal diagram of the non-contact optical sensing device in FIG. 1 when executing PS procedure.

The emitting unit 11 emits light on an object to be measured and may comprise one or more than one light emitting diode (LED). In some embodiments as shown in FIGS. 2B and 2C, the non-contact optical sensing device in accordance with the present invention comprises a first emitting unit 111 and a second emitting unit 112. In one embodiment as shown in FIG. 2A, the non-contact optical sensing device in accordance with the present invention comprises a single emitting unit 11, i.e. the first emitting unit and the second emitting unit are the same emitting unit.

The photoelectric element 12 receives the reflected light from the measured object. The reflected light is reflected from the light emitted on the measured object. The photoelectric element 12 may be a photogate or a photodiode. When the photoelectric element 12 receives and transforms the reflected light into corresponding photons to generate corresponding signals.

Figure 3:
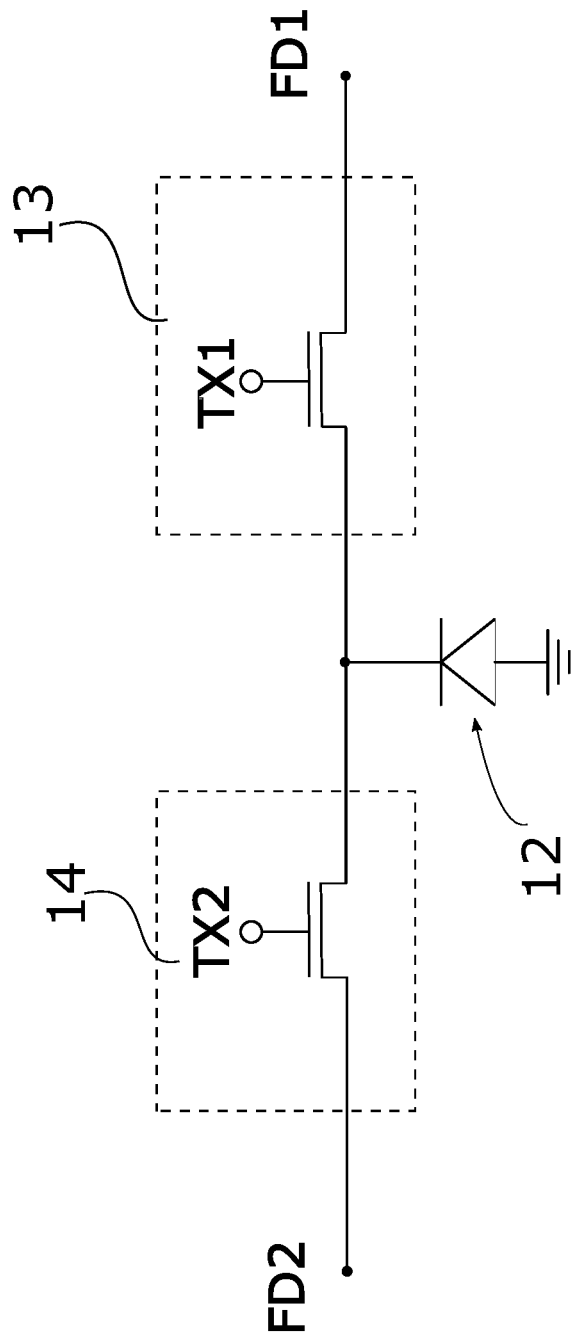
FIG. 3 is a circuit diagram of a photoelectric element, a first switching element and a second switching element of the non-contact optical sensing device in FIG. 1.

With reference to FIGS. 2A and 3, the first switching element 13 and the second switching element 14 are coupled to the photoelectric element 12 to transmit the signal of the photoelectric element 12 to the control unit 15. In one embodiment, the first switching element 13 comprises a first transfer gate TX1. The second switching element 14 comprises a second transfer gate TX2. The first switching element 13 is connected to a first electric charge storage relay point FD1. The second switching element 14 is connected to a second electric charge storage relay point FD2.

The control unit 15 is connected electrically to the emitting unit 11, the photoelectric element 12, the first switching element 13 and the second switching element 14. The control unit 15 controls the emitting unit 11 to be switched on and off, the electric potential of the photoelectric element 12, and the first and second switching elements 13, 14 to be switched on and off, and obtains the signal from the photoelectric element 12 by switching the first and second switching elements 13, 14.

With reference to FIGS. 2B, 2C, 4A and 5A, when the non-contact optical sensing device 10 is implemented, the control unit 15 executes a TOF sensing procedure and a PS procedure in a single periodic time. The control unit 15 sends control signals respectively to control the first emitting unit 111, the second emitting unit 112, the first switching element 13 and the second switching element 14. The control unit 15 obtains the output of the photoelectric element 12 by controlling the first and second switching elements 13, 14. The frequencies of the control signals for executing the TOF sensing procedure and the PS procedure are different. The TOF sensing procedure utilizes a time difference between the emitting time of the light emitted from the first emitting unit 11 and the receiving of the reflected light received by the photoelectric element 12 to obtain a first data of a depth of the measured object. The PS procedure utilizes the intensity of the reflected light received by the photoelectric element 12 to obtain the second data of the depth of the measured object, wherein the second emitting element 112 emits light to the measured object to generate the reflected light. The control unit 15 calculates and determines the depth of the measured object based on the first data and the second data.

Figure 4A:
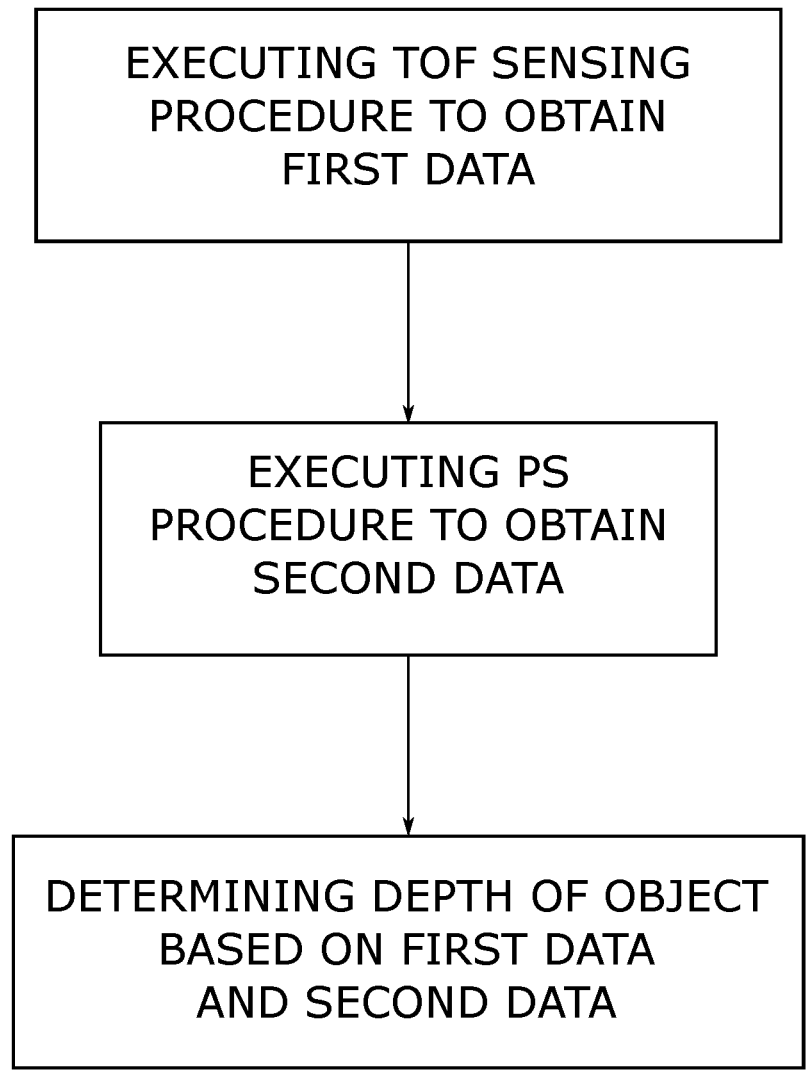
FIG. 4A is a flow chart of a first embodiment of a sensing method in accordance with the present invention.
Figure 4B:
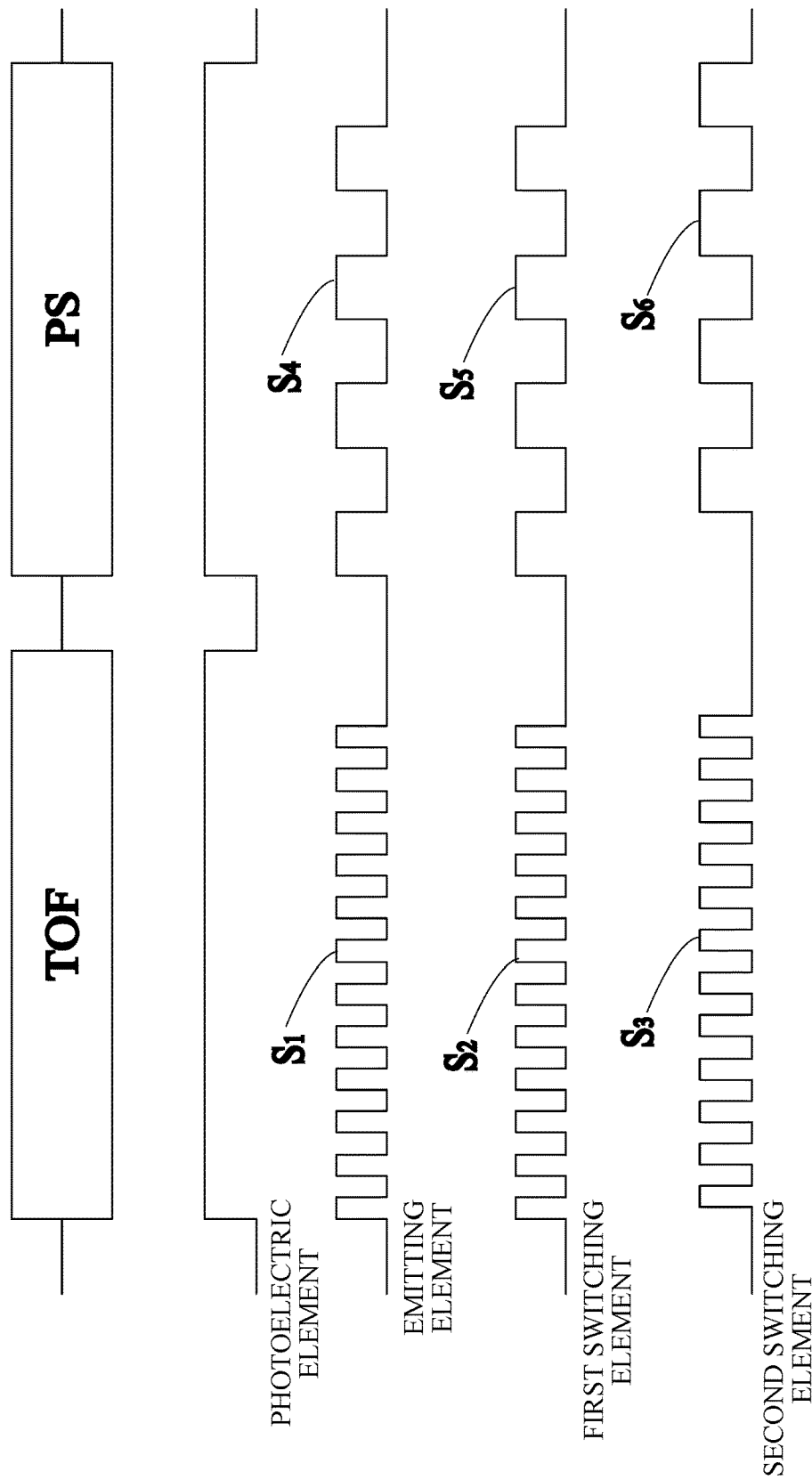
FIG. 4B is a phase diagram of the sensing method in FIG. 4A.
Figure 5A:
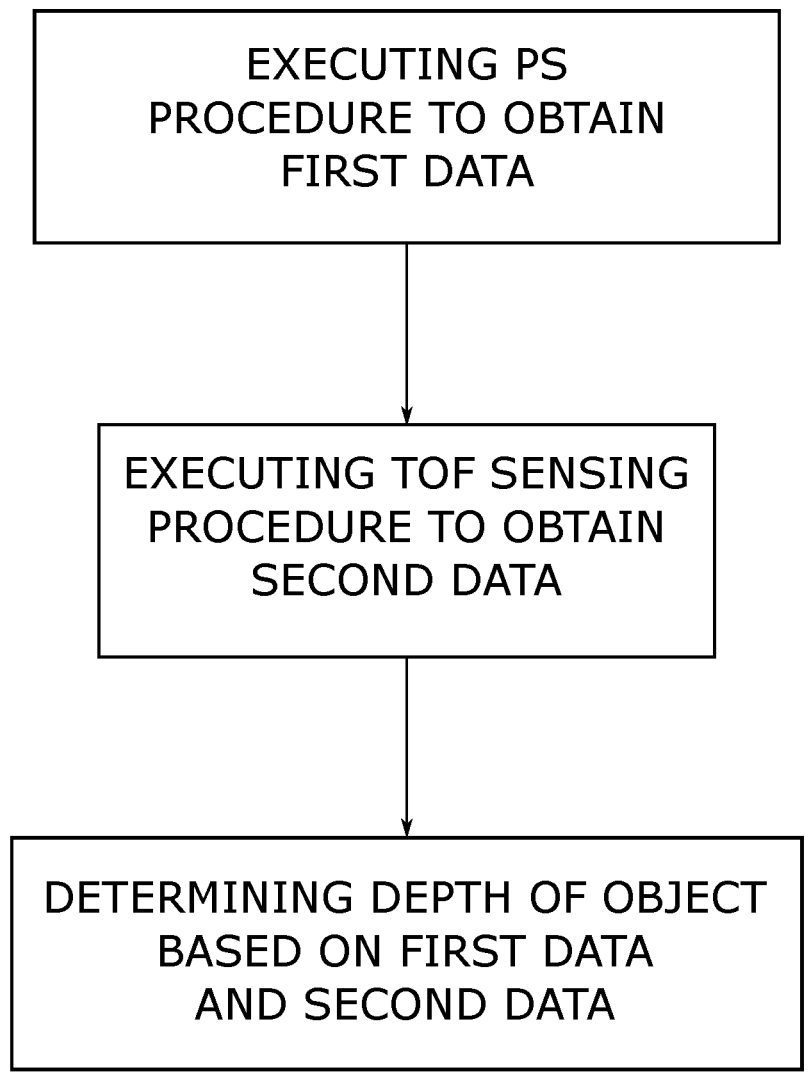
FIG. 5A is a flow chart of a second embodiment of a sensing method in accordance with the present invention.
Figure 5B:
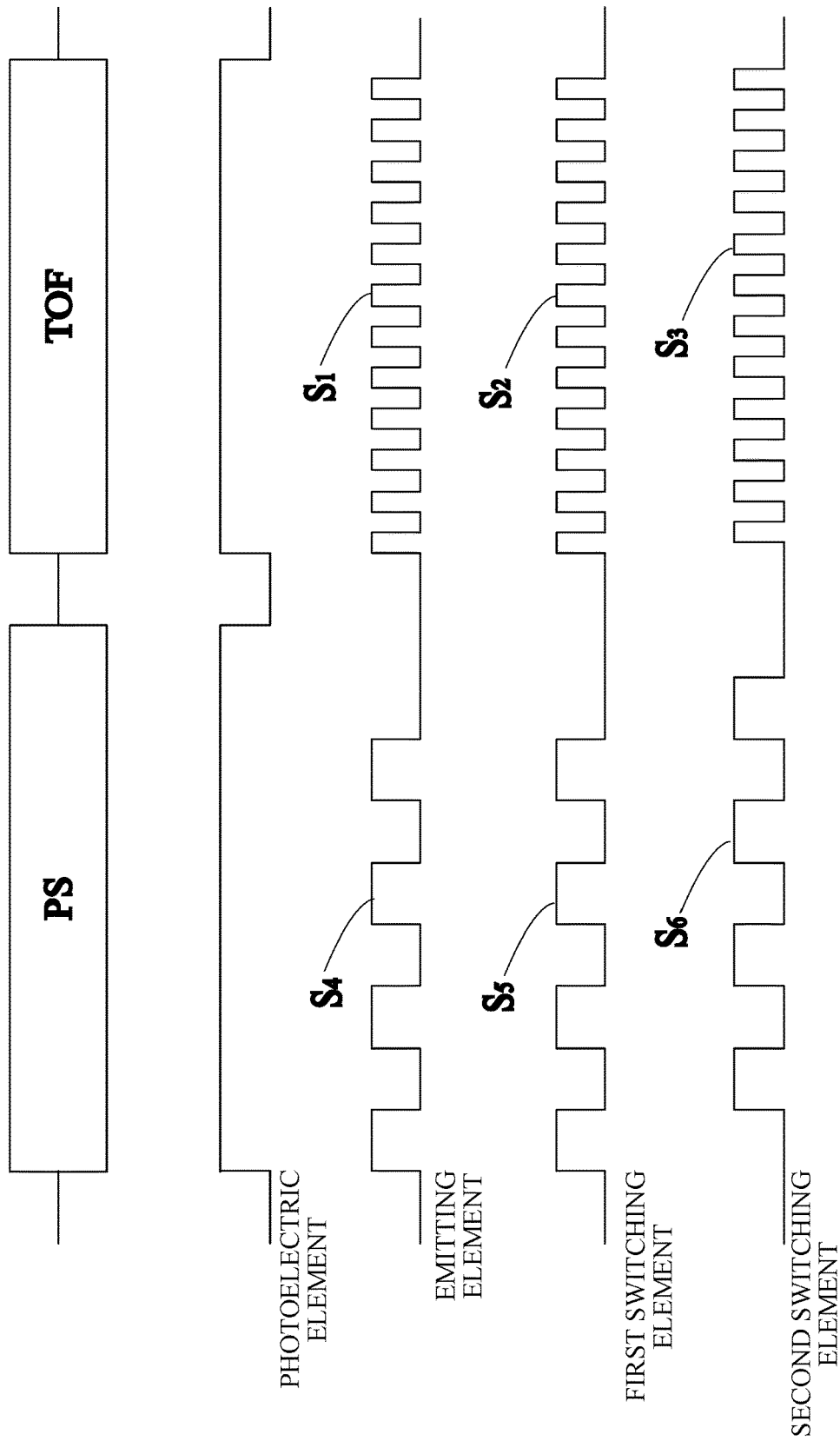
FIG. 5B is a phase diagram of the sensing method in FIG. 5A.

With reference to FIGS. 2B, 4A and 4B, in one embodiment, the TOF sensing procedure is executed first and then the PS procedure is executed. The executing time of the TOF sensing procedure and the executing time of the PS procedure are the same. With reference to FIGS. 2C, 5A and 5B, in another embodiment, the PS procedure is executed first and then the TOF sensing procedure is executed.

With reference to FIGS. 2B, 4B and 5B, when the TOF sensing procedure is executed, the control unit 15 controls the photoelectric element 12 to be switched on. The control unit 15 controls the first emitting unit 111 by a first control signal $S_1$, controls the first switching element 13 by a second control signal $S_2$ and controls the second switching element 14 by a third control signal $S_3$. The first control signal $S_1$ has a first emitting frequency. The second control signal $S_2$ and the third control signal $S_3$ have a first sampling frequency. The first emitting frequency is the same with the first sampling frequency. In one embodiment, when the first emitting element 111 is switched on, the first switching element 13 is turned on simultaneously while the second switching element 14 is delayed to be turned on. Specifically, a phase of the second control signal $S_2$ and a phase of the third control signal $S_3$ is different and the phase difference may be 90 degrees as shown in FIGS. 4B and 5B, 180 degrees, 270 degrees and so on. Further, a phase of the first control signal $S_1$ and the phase of the second control signal $S_2$ may be the same, or the phase of the first control signal $S_1$ and the phase of the third control signal $S_3$ may be the same. In one embodiment, the second control signal $S_2$ is supplied to the first transfer gate TX1. The third control signal $S_3$ is supplied to the second transfer gate TX2.

With reference to FIGS. 2C, 4B and 5B, when the PS procedure is executed, the control unit 15 controls the photoelectric element 12 to be switched on. The control unit 15 controls the second emitting unit 112 by a fourth control signal $S_4$, controls the first switching element 13 by a fifth control signal $S_5$ and controls the second switching element 14 by a sixth control signal $S_6$. The fourth control signal $S_4$ has a second emitting frequency. The fifth control signal $S_5$ and the sixth control signal $S_6$ have a second sampling frequency. The second emitting frequency is the same with the second sampling frequency. However, the first sampling frequency of the TOF sensing procedure is larger than the second sampling frequency of the PS procedure. In one embodiment, when the second emitting element 112 is switched on, the first switching element 13 is turned on simultaneously while the second switching element 14 is delayed to be turned on. Specifically, a phase of the fifth control signal $S_5$ and a phase of the sixth control signal $S_6$ is different and the phase difference may be 90 degrees, 180 degrees as shown in FIGS. 4B and 5B, 270 degrees and so on. Further, a phase of the fourth control signal $S_4$ and the phase of the fifth control signal $S_5$ may be the same, or the phase of the fourth control signal $S_4$ and the phase of the sixth control signal $S_6$ may be the same. In one embodiment, the fifth control signal $S_5$ is supplied to the first transfer gate TX1. The sixth control signal $S_6$ is supplied to the second transfer gate TX2.

Figure 6:
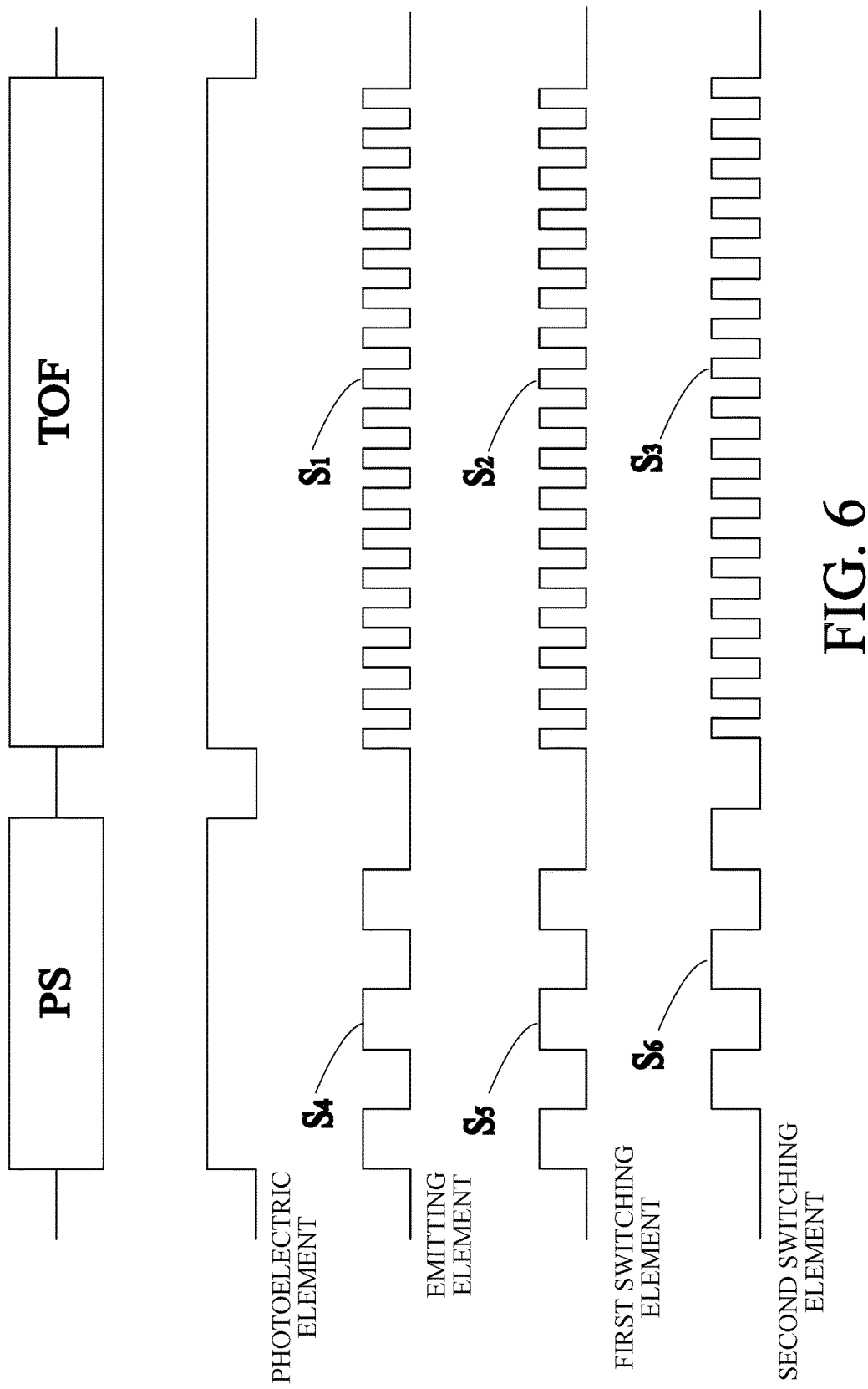
FIG. 6 is a phase diagram of a third embodiment of a sensing method in accordance with the present invention.
Figure 7:
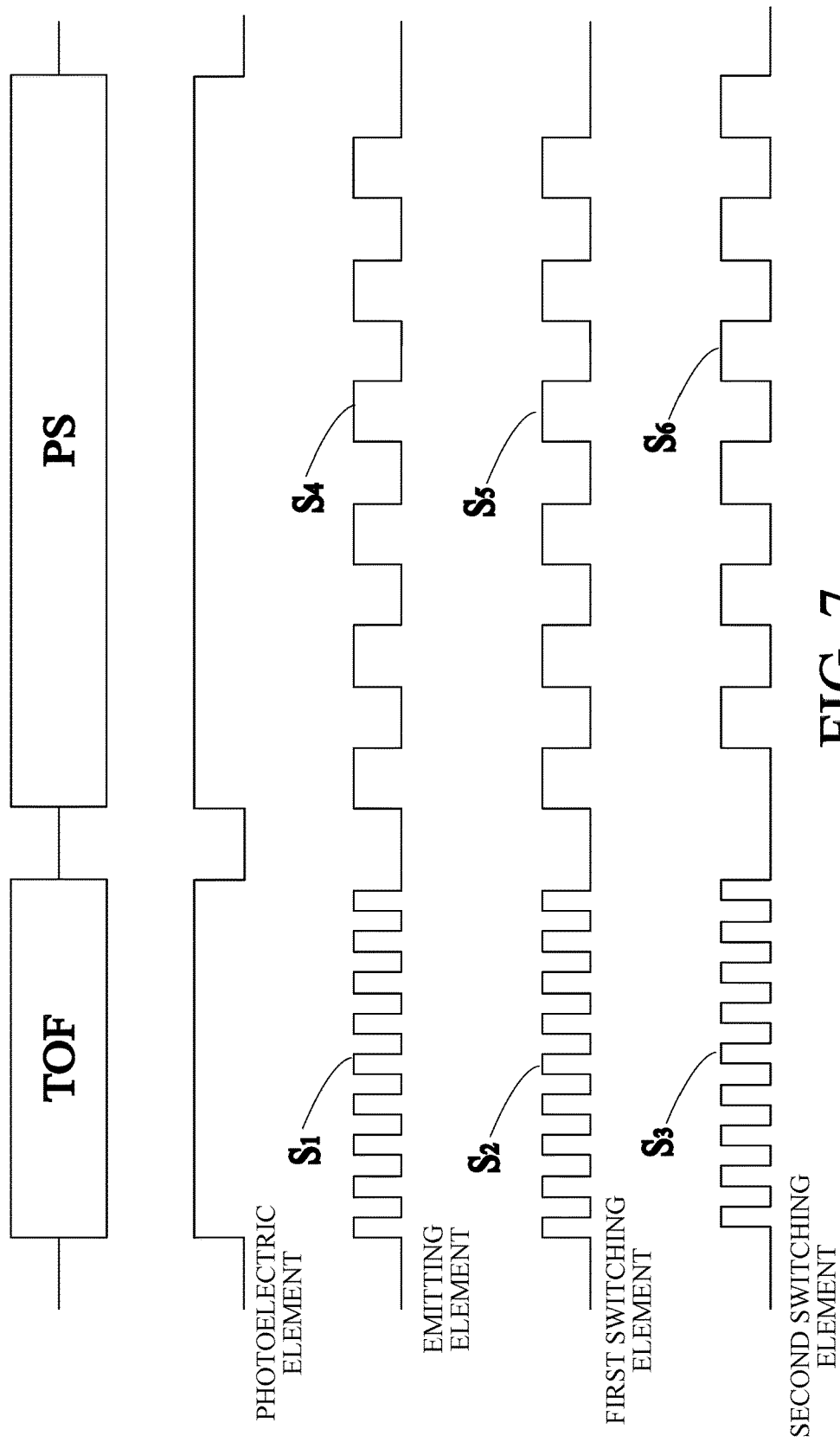
FIG. 7 is a phase diagram of a fourth embodiment of a sensing method in accordance with the present invention.

In addition, the time to execute the TOF sensing procedure may be longer than the time to execute the PS procedure as shown in FIG. 6. Otherwise, the time to execute the TOF sensing procedure may be shorter than the time to execute the PS procedure as shown in FIG. 7.

Moreover, the calculation method of the control unit 15 to calculate and to determine the depth of the measured object based on the first data and the second data may comprises two different ways, but is not limited to the two ways.

Figure 8:
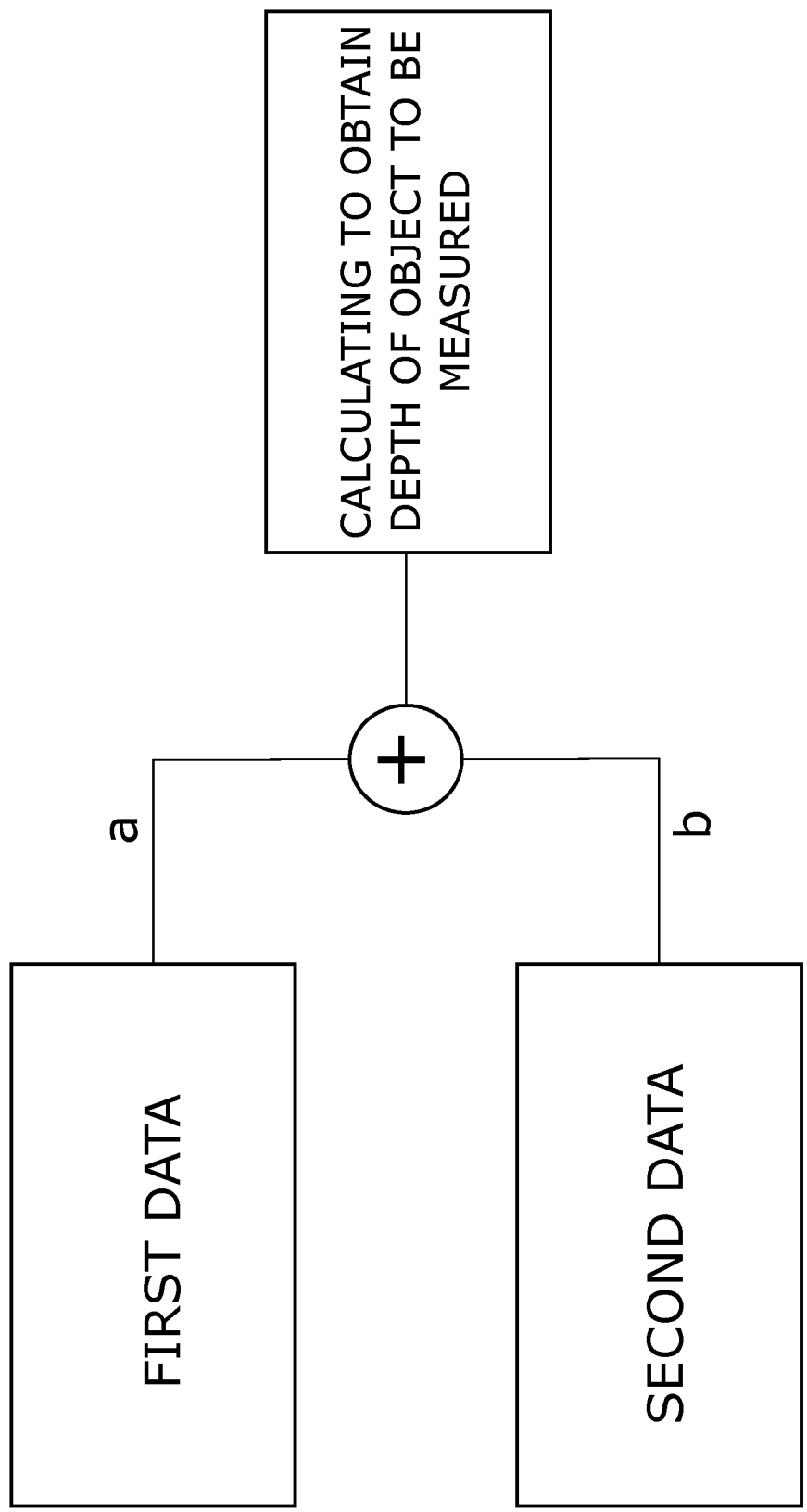
FIG. 8 is a flow chart of a first embodiment of calculating the depth of the object in a sensing method in accordance with the present invention.

First method is shown in FIG. 8. The control unit 15 respectively multiplies the first data and the second data by two different weight parameters a, b to calculate and to obtain the depth of the measured object. In one embodiment, a is equal to b and is equal to 0.5, i.e. the first data and the second data multiply by 0.5 to obtain the depth of the measured object.

Figure 9:
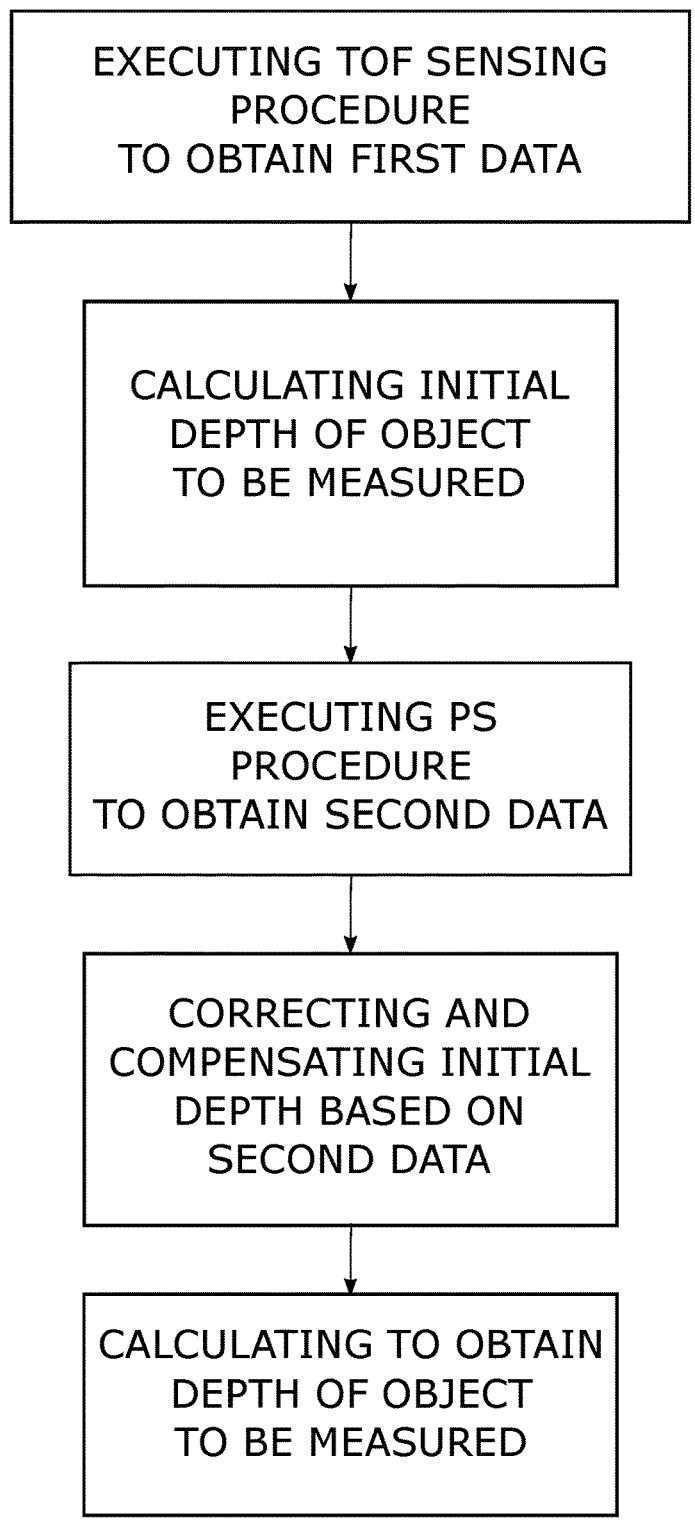
FIG. 9 is a flow chart of a second embodiment of calculating the depth of the object in a sensing method in accordance with the present invention.
Figure 10:
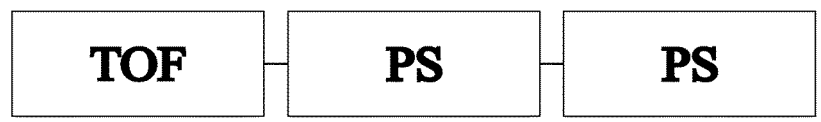
FIG. 10 is an illustrative block diagram of one embodiment of the method in FIG. 9.

With reference to FIG. 9, the control unit 15 obtains an initial depth of the measured object based on the first data obtained by executing the TOF sensing procedure. Then the PS procedure is executed to obtain the second data. The second data is used to correct and compensate the initial depth of the measured object so that a depth of the measured object is obtained. Therefore, using the first data with low resolution but with absolute depth data obtains the initial depth. Then using the second data with high resolution corrects the initial depth to obtain the depth of the measured object. In one embodiment, the sequence to execute the TOF sensing procedure and the PS procedure is changeable. In one embodiment as shown in FIG. 10, in a periodic time, an initial depth $z_1$ is obtained by executing one TOF sensing procedure. Two auxiliary depths $z'_{11}$, $z'_{12}$ are obtained by executing two PS procedures. One of the auxiliary depths is subtracted from another one of the auxiliary depths to obtain a difference $\Delta z'_1$.

$$\Delta z'_1 = z'_{12} - z'_{11}$$

The difference $\Delta z'_1$ is used to correct and compensate the initial depth $z_1$. Thus, the depth of the measured object is equal to the different $\Delta z'_1$ plus the initial depth $z_1$ ($z_1 + \Delta z'_1$).

Figure 11:
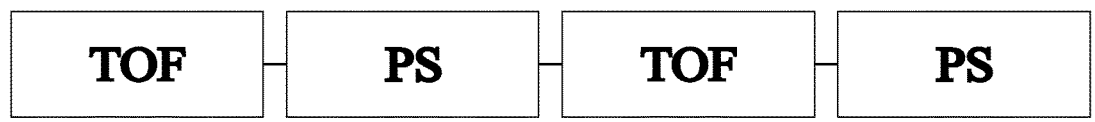
FIG. 11 is an illustrative block diagram of another embodiment of the method in FIG. 9.

In another embodiment as shown in FIG. 11, in a periodic time, one TOF sending procedure and one PS procedure are executed and the obtained data of the two adjacent periodic times are compared to obtain the initial depth $z_1$ and auxiliary depths $z'_{11}$, $z'_{12}$. Then one of the auxiliary depths is subtracted from another one of the auxiliary depths to obtain the difference $\Delta z'_1$.

$$\Delta z'_1 = z'_{12} - z'_{11}$$

The difference $\Delta z'_1$ is used to correct and compensate the initial depth $z_1$. Thus, the depth of the measured object is equal to the different $\Delta z'_1$ plus the initial depth $z_1$ ($z_1 + \Delta z'_1$).

Therefore, the non-contact optical sensing device in accordance with the present invention executes the TOF sensing procedure with high accuracy and the PS procedure with high resolution to obtain two different data of the depth of the measured object. After calculation, the depth of the measured object is obtained. Thus, the non-contact optical sensing device in accordance with the present invention has both advantages of high accuracy and high resolution to determine the depth of the object precisely.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A method for sensing a depth of an object in three dimensional space, in one periodic time, comprising steps of:
   a. emitting light by a first emitting unit to the object in a first emitting frequency to generate a first reflected light, and obtaining a first data based on a time difference between an emitting time of the first emitting unit to emit the light and a receiving time of the first reflected light, wherein the first data is obtained by switching a first switching element and a second switching element in a first sampling frequency, and the first emitting frequency is the same with the first sampling frequency;
   b. emitting light by a second emitting unit to the object in a second emitting frequency to generate a second reflected light, and obtaining a second data based on an intensity of the second reflected light, wherein the second data is obtained by switching the first switching element and the second switching element in a second sampling frequency, the second emitting frequency is the same with the second sampling frequency, and the first sampling frequency is larger than the second sampling frequency; and
   c. determining the depth of the object by calculating the first data and the second data.

2. The method as claimed in claim 1, wherein the step a is executed first and then the step b is executed.

3. The method as claimed in claim 1, wherein the step b is executed first and then the step a is executed.

4. The method as claimed in claim 1, wherein a time to execute the step a is longer than a time to execute the step b.

5. The method as claimed in claim 1, wherein a time to execute the step a is shorter than a time to execute the step b.

6. The method as claimed in claim 1, wherein a time to execute the step a is equal to a time to execute the step b.

7. The method as claimed in claim 1, wherein
   an initial depth is calculated first based on the first data obtained in the step a and then the step b is executed to obtain the second data; and
   in the step c, the second data is used to correct and compensate the initial depth to obtain the depth of the object.

8. The method as claimed in claim 1, wherein in the step c, the first data and the second data are calculated to obtain the depth of the object after respectively multiplying by different weight parameters.

9. The method as claimed in claim 1, wherein the first emitting unit and the second emitting unit are the same one emitting unit.

10. A non-contact optical sensing device comprising:
    a first emitting unit adapted for emitting light to an object in a first emitting frequency;
    a second emitting unit adapted for emitting light to the object in a second emitting frequency;
    a photoelectric element adapted for receiving a reflected light from the object;
    a first switching element coupling to the photoelectric element;
    a second switching element coupling to the photoelectric element;
    a control unit electrically connecting to the first emitting unit, the second emitting unit, the photoelectric element, the first switching element and the second switching element, controlling the first and second switching elements to obtain an output of the photoelectric element, and alternatively switching on the first and second switching elements, wherein
    the control unit executes following steps in one periodic time:
    a. obtaining a first data based on a time difference between an emitting time of the first emitting unit to emit the light and a receiving time of the reflected light received by the photoelectric element, wherein the first data is obtained by switching a first switching element and a second switching element in a first sampling frequency, and the first emitting frequency is the same with the first sampling frequency;
    b. obtaining a second data based on an intensity of the reflected light corresponding to the second emitting unit, wherein the second data is obtained by switching the first switching element and the second switching element in a second sampling frequency, the second emitting frequency is the same with the second sampling frequency, and the first sampling frequency is larger than the second sampling frequency; and c. determining the depth of the object by calculating the first data and the second data.

11. The non-contact optical sensing device as claimed in claim 10, wherein in the step a executed by the control unit, the control unit controls the first emitting unit by a first control signal, controls the first switching element by a second control signal and controls the second switching element by a third control signal, wherein the first control signal has the first emitting frequency, the second and third control signals have the first sampling frequency and a phase of the second control signal and a phase of the third control signal are different; and in the step b executed by the control unit, the control unit controls the second emitting unit by a fourth control signal, controls the first switching element by a fifth control signal and controls the second switching element by a sixth control signal, wherein the fourth control signal has the second emitting frequency, the fifth and sixth control signals have the second sampling frequency, and a phase of the fifth control signal and a phase of the sixth control signal are different.

12. The non-contact optical sensing device as claimed in claim 11, wherein a phase of the first control signal is the same with the phase of the second control signal; and a phase of the fourth control signal is the same with the phase of the fifth control signal.

13. The non-contact optical sensing device as claimed in claim 11, wherein a phase difference between the second and third control signals is 90 degrees.

14. The non-contact optical sensing device as claimed in claim 11, wherein a phase difference between the fifth and sixth control signals is 180 degrees.

15. The non-contact optical sensing device as claimed in claim 11, wherein the control unit executes the step a first and then executes the step b.

16. The non-contact optical sensing device as claimed in claim 11, wherein the control unit executes the step b first and then executes the step a.

17. The non-contact optical sensing device as claimed in claim 10, wherein the first emitting unit and the second emitting unit are the same one emitting unit.

18. The non-contact optical sensing device as claimed in claim 10, wherein the first switching element comprises a first transfer gate, and the second switching element comprises a second transfer gate.

* * * * *